Figure 14:
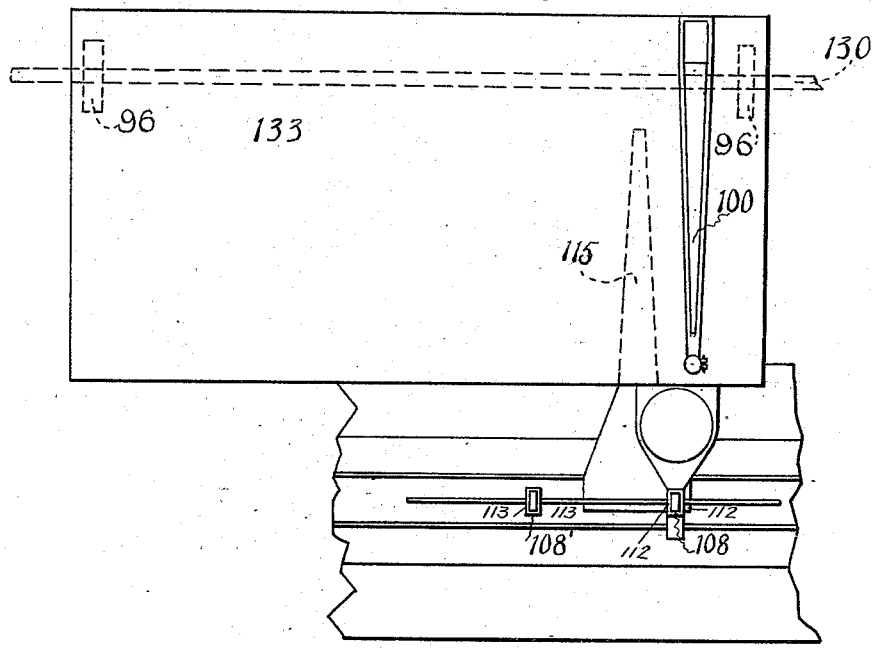

(No Model.) 7 Sheets—Sheet 1.
T. OLSEN.
MACHINE FOR TESTING PROPERTIES OF MATERIALS UNDER TENSILE STRESS.
No. 554,297. Patented Feb. 11, 1896.
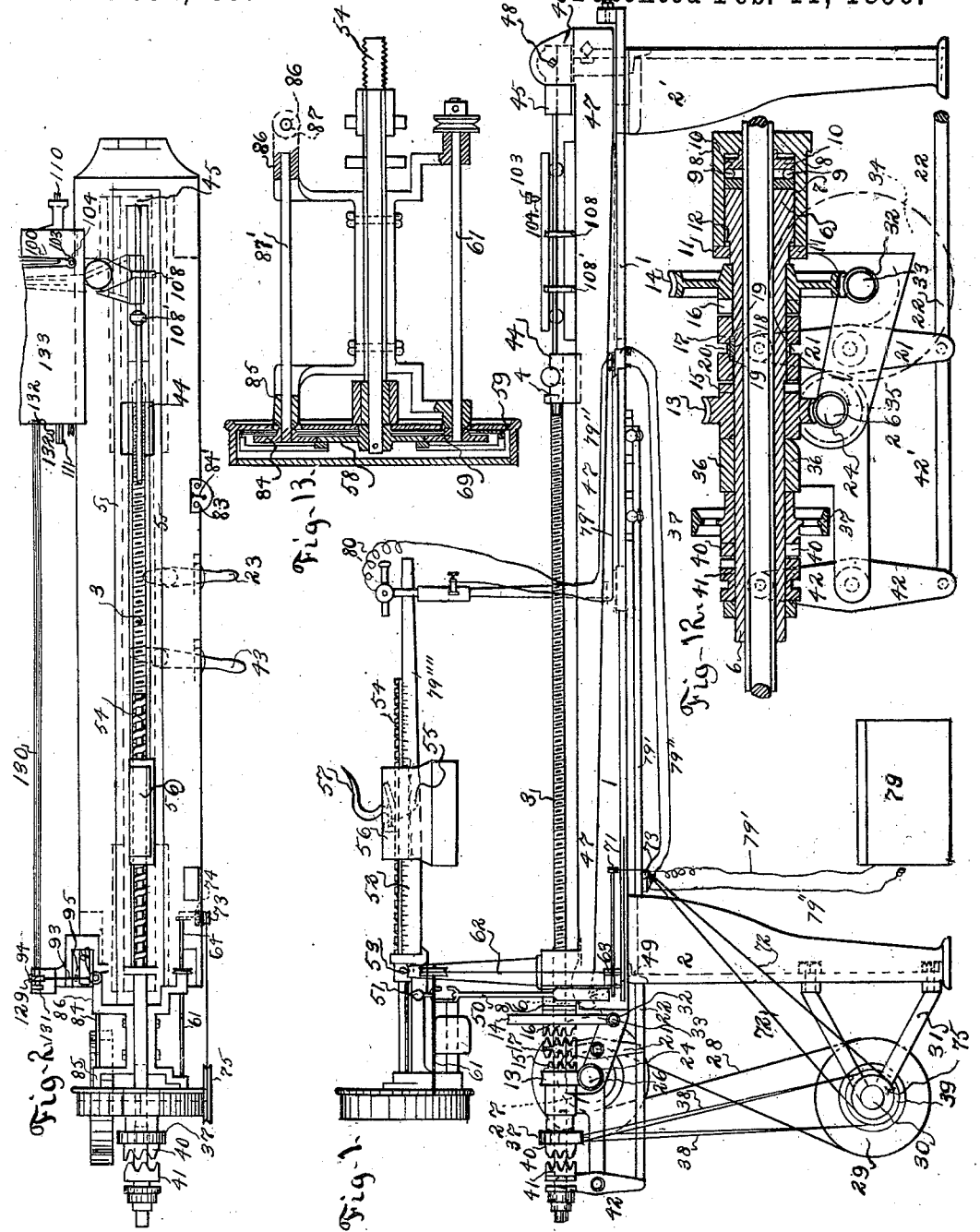
Witnesses:
INVENTOR (No Model.) 7 Sheets—Sheet 2.
T. OLSEN.
MACHINE FOR TESTING PROPERTIES OF MATERIALS UNDER TENSILE STRESS.
No. 554,297. Patented Feb. 11, 1896.
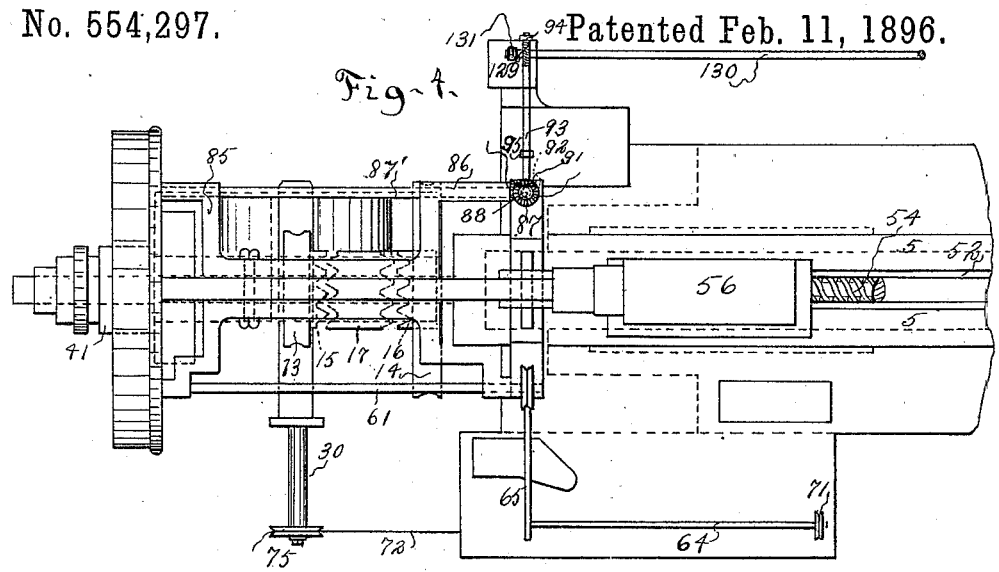
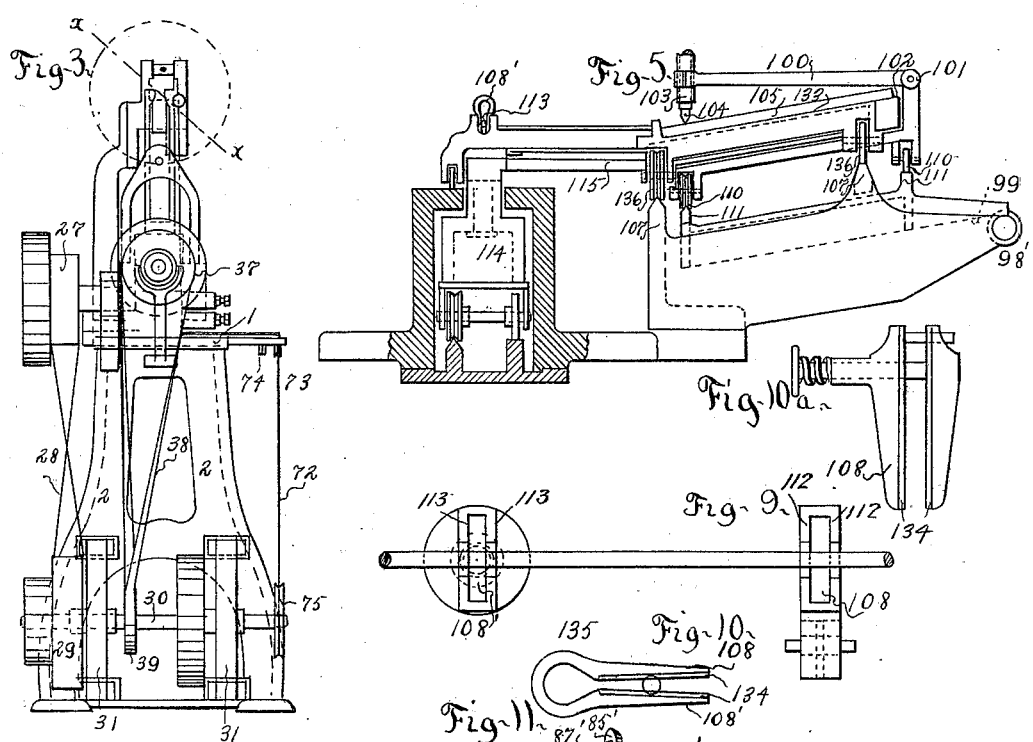
WITNESSES: INVENTOR

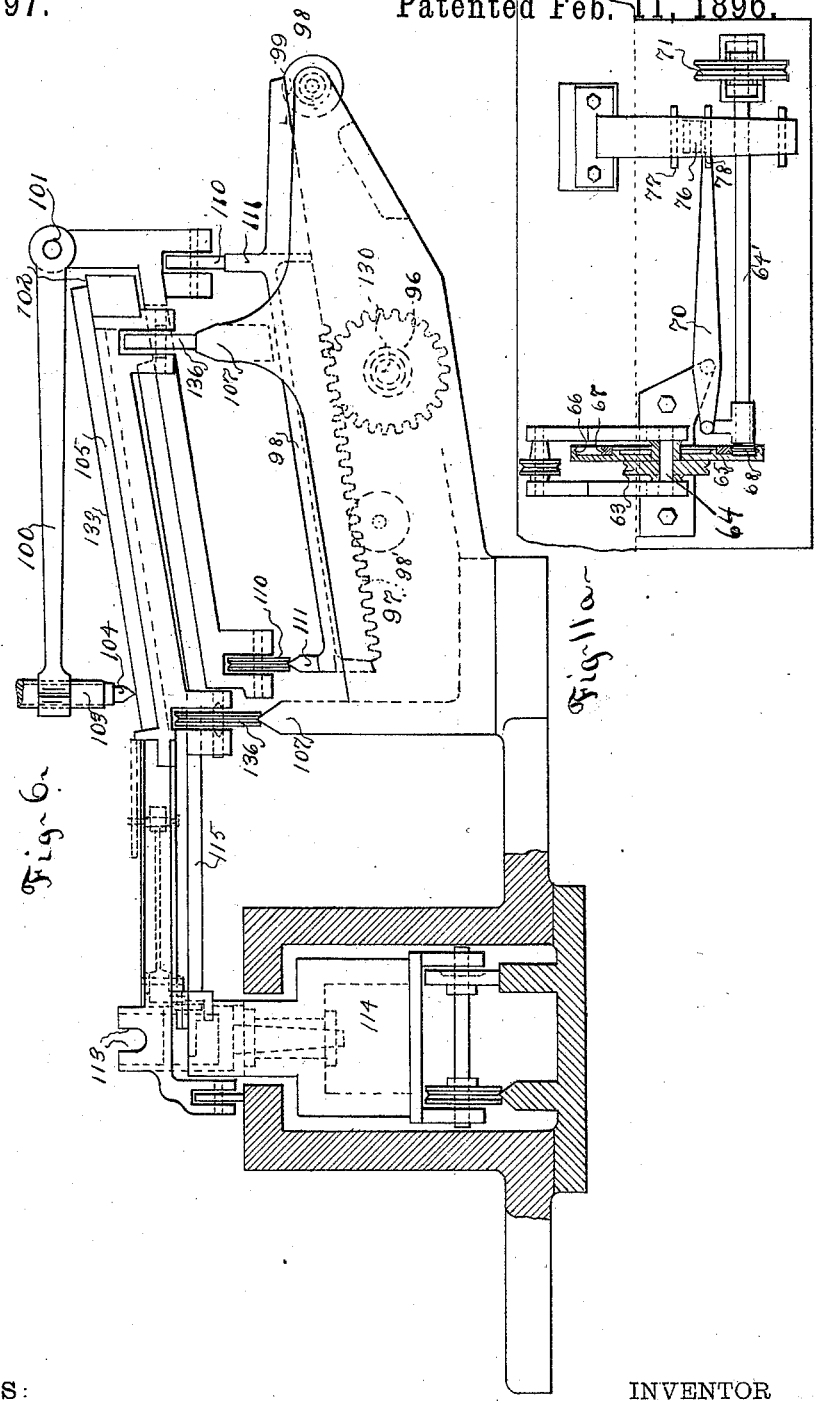

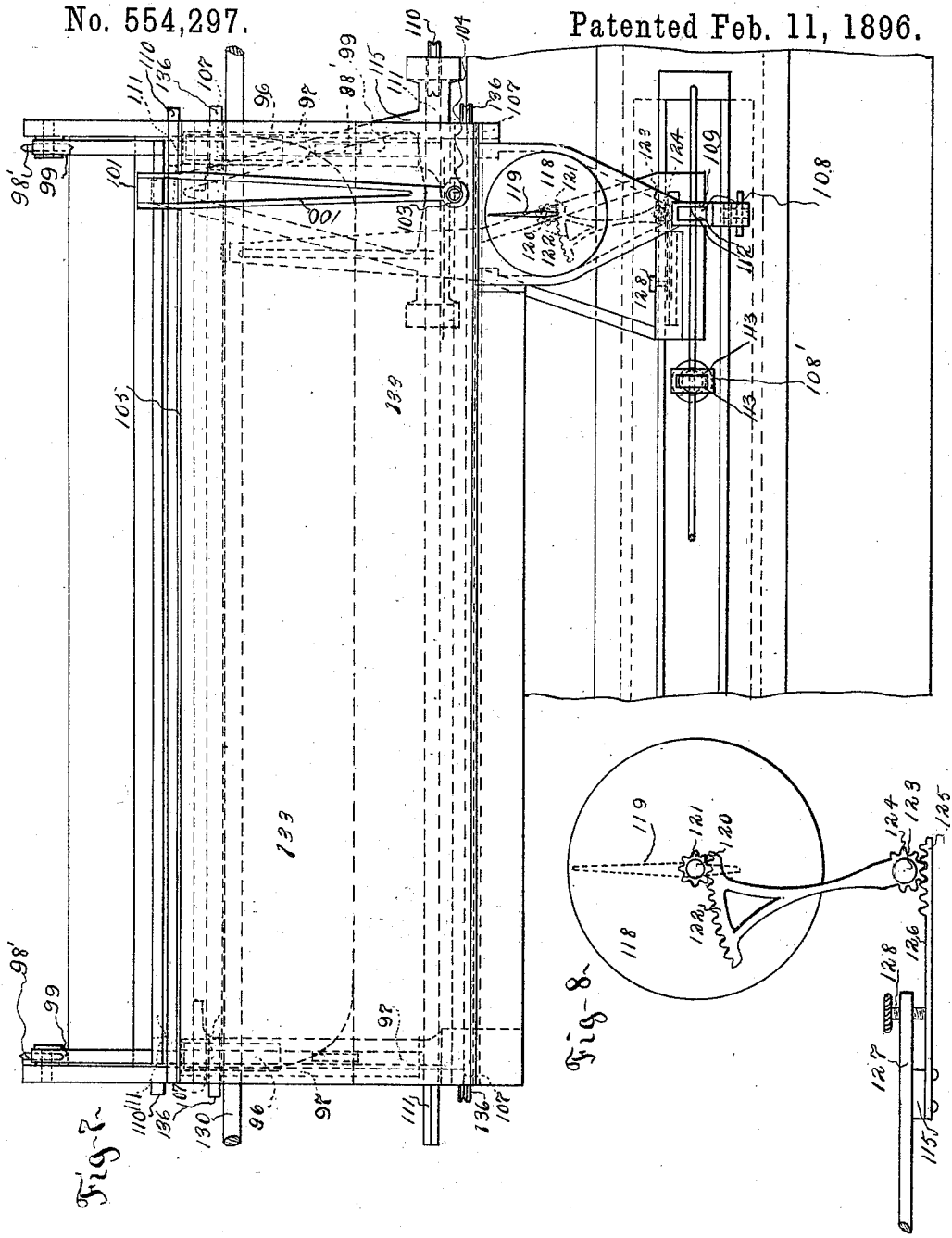

(No Model.) 7 Sheets—Sheet 5.

T. OLSEN.
MACHINE FOR TESTING PROPERTIES OF MATERIALS UNDER TENSILE STRESS.

No. 554,297. Patented Feb. 11, 1896.

WITNESSES: INVENTOR (No Model.) 7 Sheets—Sheet 6.
T. OLSEN.
MACHINE FOR TESTING PROPERTIES OF MATERIALS UNDER TENSILE STRESS.
No. 554,297. Patented Feb. 11, 1896.
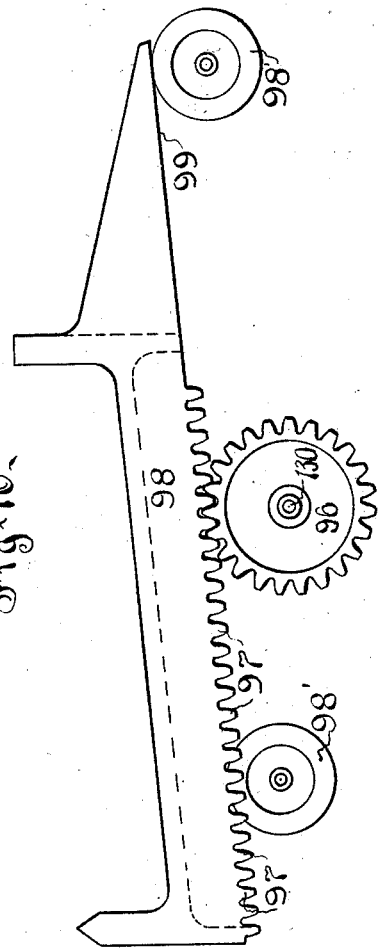
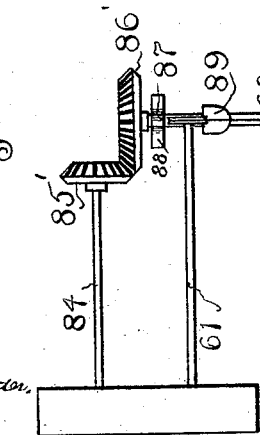
WITNESSES:
A. V. W. Budd
Casey C. Cadwallader
INVENTOR
Tinius Olsen
by Sluye Wiegand
atty (No Model.) 7 Sheets—Sheet 7.
T. OLSEN.
MACHINE FOR TESTING PROPERTIES OF MATERIALS UNDER TENSILE STRESS.
No. 554,297. Patented Feb. 11, 1896.
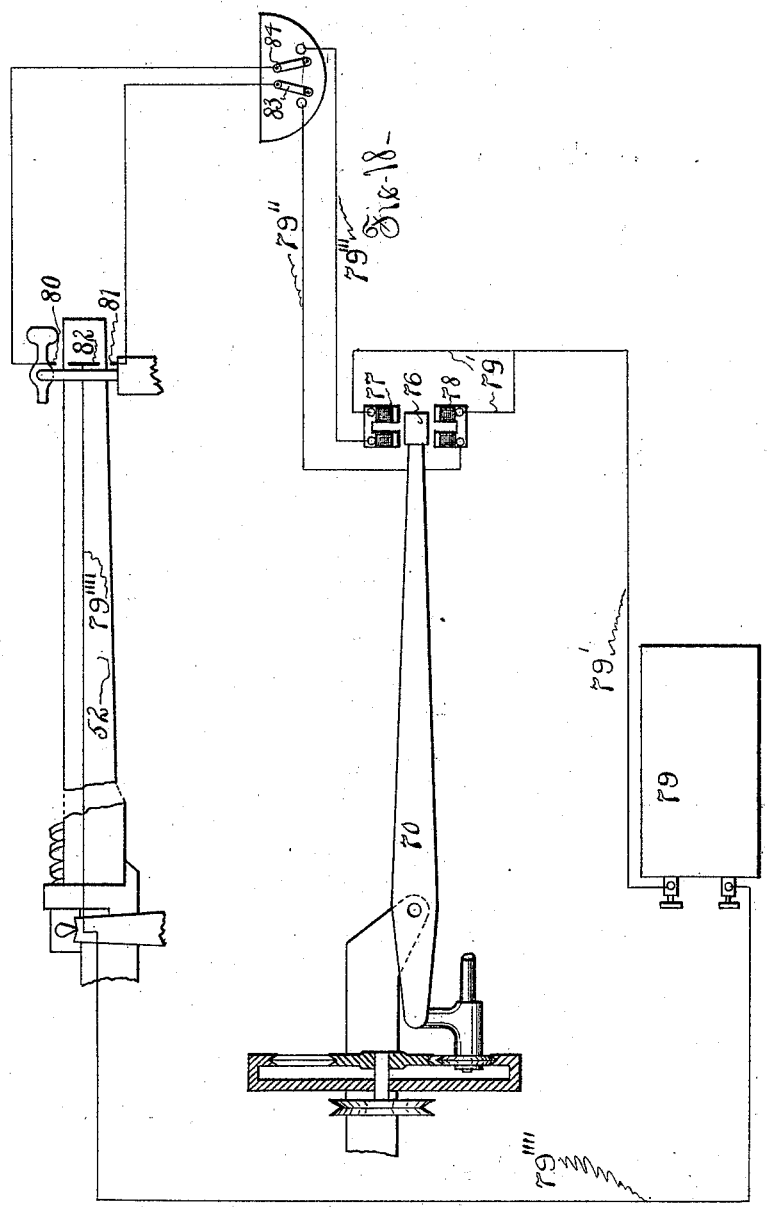

UNITED STATES PATENT OFFICE.

TINIUS OLSEN, OF PHILADELPHIA, PENNSYLVANIA.

MACHINE FOR TESTING PROPERTIES OF MATERIALS UNDER TENSILE STRESS.

SPECIFICATION forming part of Letters Patent No. 554,297, dated February 11, 1896.

Application filed May 22, 1894. Serial No. 512,111. (No model.)

*To all whom it may concern:*

Be it known that I, TINIUS OLSEN, a citizen of the United States, residing at Philadelphia, in the county of Philadelphia and State of Pennsylvania, have invented certain new and useful Improvements in Machines for Testing the Properties of Materials under Tensile Stress; and I do hereby declare the following to be a sufficiently full, clear, and exact description thereof as to enable others skilled in the art to make and use the said invention.

This invention relates to machines for testing the tensile strength of specimens, and is especially adapted to the testing of wires, or strips of metal, or other like-shaped specimens, and has for its object the facility of placing the specimens in the machine, and of applying stress thereto, facility of reading indications of the degree of tension or stress, the extent of elongation, and elastic limit, and of graphically recording automatically the stresses and degrees of extension of the specimen at different stages of the operation.

A machine embodying this invention consists of a bed plate or frame, a screw and nut for applying stresses, a clamp attached to the moving screw, and a second clamp attached to the weighing mechanism for holding and stretching the specimen, gripping devices applicable to intermediate points on the specimen and connected to an indicator or dial and a recording-surface, and a moving pencil for marking upon the recording-surface the lines indicative of the degree of stress, actuated by a connection with the stress-weighing mechanism so that by the combined motion of the recording-surface and pencil a diagram is produced showing the relative functions of stresses and extensions as measured between definite points in the length of the specimen.

The construction and operation of this machine are hereinafter fully described and shown in the accompanying drawings, in which—

Figure 15:
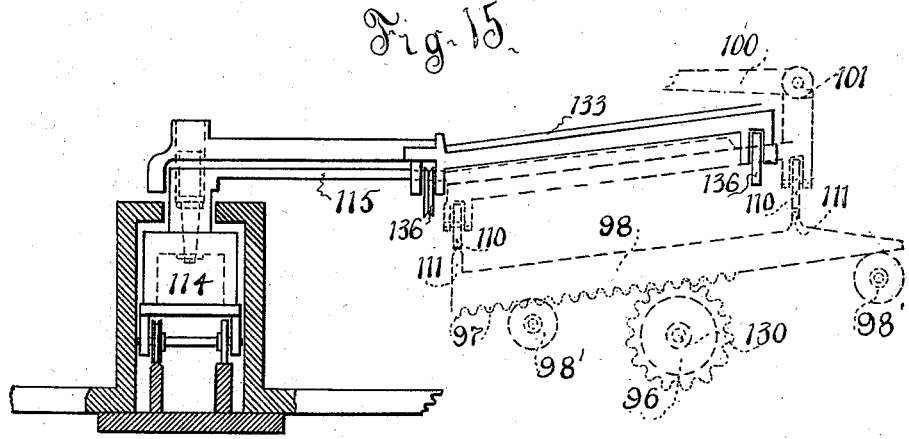

Figure 1 shows a front elevation of the machine; Fig. 2, a top view with a portion of the recording-table and pencil mechanism omitted; Fig. 3, an end elevation showing the driving or stress-applying mechanism; Fig. 4, a partial top view, on an enlarged scale, of the stress-applying mechanism, poise-actuating and part of the pencil-actuating mechanisms; Fig. 5, an enlarged transverse section showing part of the mechanisms operating the recording-pencil, and the recording-table; Fig. 6, an enlarged section of the pencil-actuating mechanisms and of the mechanism for indicating minute extensions upon a dial with a multiplied movement to facilitate observation of the phenomena of elastic limit. Fig. 7 shows a top view of the parts embraced in Figs. 5 and 6; Fig. 8, a detached plan view of the mechanism operating the index for showing upon the dial with multiplied motion minute degrees of extension in the specimen; Fig. 9, the arrangement of mechanism for applying clamps to the specimen at definite points so as to measure the extension between such points to the exclusion of any changes in other parts of the specimen; Fig. 10, a clamp for attaching such mechanism to the specimen. Fig. 10ª shows another form of clamp for this purpose; Fig. 11, a detached view of a portion of the mechanism for transmitting motion from the stress-weighing mechanism to the recording-surface. Fig. 11ª is a detached view of another portion of said mechanism. Fig. 12 is an enlarged section of the nut and mechanism for rotating it upon the screw for applying stresses. Fig. 13 is a section in the plane indicated by the dotted line $x\,x$ in Fig. 3, showing the mechanism for moving the pea or poise weight upon the weighing-beam. Fig. 14 shows a detached plan view of the recording-table and the mechanism for connecting the same with the specimen to move with the extension thereof. Fig. 15 shows a transverse section thereof with the pencil-operating mechanism shown in dotted lines. Fig. 16 shows an elevation of the rack and pinion mechanism for operating the pencil-carrier from the stresses of the machine, and Fig. 17 is a detached view of the train of mechanism for transmitting motion from the stress-weighing mechanism to the pencil-actuating mechanism. Fig. 18 shows the electromagnetic parts of the apparatus and the electric circuit, electrodes, and switches, and the parts immediately connected therewith, which from the construction of the machine are incapable of appearing clearly in any of the preceding figures, partly on account of the small size of some parts and also that some parts which perform mechanical functions are embraced in the electric circuits as components thereof.

1 is the bed-plate of the machine; 2 and 2', leg-frames attached to the ends thereof and supporting it; 3, a screw having its axis parallel with the bed 1 and attached by one end to a carriage or draw-head 4, bearing a gripping-clamp 44, moved by the screw 3 on guides 5 lengthwise of the bed 1. 6 is a nut fitted upon the threads of the screw 3 and turning in a bearing 7, formed in the standard 8 at the end of the bed 1. The end-thrust of the nut 6, during the application of tensile stress, is received upon balls 9, interposed between the end of the nut 6 and a shoulder or internal collar 10 in the bearing 7. The thrust of the nut 6 in opposite direction of motion is received by a collar 11, attached to the standard 8, bearing against the shoulder 12 on the nut 6. The portion of the nut 6 extending beyond the collar 11 is of cylindric form, concentric with the axis of the screw 3, and is fitted with two worm-wheels 13 and 14, which turn freely thereon. The worm-wheels 13 and 14, respectively, have attached to or formed on them a toothed driving member of a clutch 15 and 16, adapted to engage with a correspondingly-toothed driven member of a clutch attached to or formed on opposite ends of a sleeve 17, which slides upon the nut 6, and is provided with a key 18, fitting a key-seat 19 in the nut and in the sleeve, which compel the nut 6 and sleeve to rotate together.

A circumferential groove 20 in the sleeve 17 receives the end of a lever 21, connected by a link 22 to a hand-lever 23, which serves to move the sleeve 17 lengthwise on the nut 6, so as to engage it alternatively with either worm-wheel 13 or 14 or to hold it disengaged from both. The worm-wheel 13 is rotated by an endless screw 24, supported in a bearing 26 and turned by a pulley 27 and belt 28 from a pulley 29 on a shaft 30, supported in bearings 31, attached to the leg-frame 2. The worm-wheel 14 is turned by an endless screw 32, supported in a bearing 33, and rotated by a toothed wheel 34, engaged in a pinion 35 on the endless screw 24, so that the endless screw 32 and worm-wheel 14 turn much slower than the endless screw 24 and worm-wheel 13, and as a consequence the velocity of rotation of the nut 6 can be changed by engaging the sleeve 17 with one or the other of the worm-wheels by means of the hand-lever 23. Beyond the worm-wheel 13 there is a bearing 36, which supports the nut 6.

A pulley 37 is fitted so as to turn upon the nut 6 beyond the bearing 36, and is turned by a belt 38 driven by a pulley 39 in the shaft 30. On the outer end of the hub of the pulley 37 there is a driving member 40, of a clutch in which a driven member 41, fitted to slide on the nut 6, engages and disengages by means of a lever 42, engaging in a groove in the driven member 41 of the clutch and connected by a link 42' to a hand-lever 43, by which means the pulley 37 may be engaged with or disengaged from the nut 6 so as to turn it when desired.

The direction of motion of the belts 28 and 38 and the direction of the threads and motion of the endless screws 24 and 32 are such that the pulley 37, when engaged with the nut 6, rapidly moves the screw from left to right as the screw is shown in Fig. 1, thus releasing the tension upon specimens gripped in the clamp 44 and the clamp 45, as more fully hereinafter stated. When the worm-wheel 13 is engaged with the nut 6, tension is applied with moderate celerity, and when the worm-wheel 14 is engaged with the nut 6 then tension is applied slowly and with much greater force.

The screw 3 is attached to a carriage or draw-head 4, having a clamp 44 attached thereto. By means of this clamp 44 the wire to be tested is gripped and the opposite end is placed in a second clamp 45. The clamp 45 is connected by a bearing resting against knife edges to the short vertical arm 46 of the beam 47, which beam has supporting knife edges 48 resting against a fulcrum-plate in the end of the bed-plate 1, and also has at the opposite end of its long horizontal arm knife edges 49 and a link 50 connecting them with the knife edges 51 of the graduated weighing-beam 52, which is balanced upon knife edges 53.

A screw 54, mounted upon the beam 52, parallel with the line of the graduated edge thereof, engages in the segment 55 of a nut pivotally attached within the pea or poise weight 56, which can be readily engaged in and disengaged from the screw 54 by means of the lever 57. The screw 54 is actuated by a toothed wheel 58, fastened upon the end of it, and also carries a graduated dial 59, furnishing readings of fractions of rotations of the screw indicative of the position of the poise-weight. The wheel 58 is rotated by a pinion 60, engaging therein and turned by an arbor 61 by means of a pulley on said arbor coincident in vertical plane with the knife edges 53, moved by a cord 62, also in the same vertical plane and actuated by a pulley 63 on an arbor 64. The arbor 64 is turned by a friction-wheel 65, having an internal or concave frictional rim 66, and also a convex frictional rim 67, as shown in the section in Fig. 11ª.

A small friction-wheel 68, of such diameter as to clear in the space between the rims 66 and 67 of the wheel 65 and to engage either with slight change of position, is fixed upon and constantly rotated by an arbor 64', supported on a lever 70 and turned by a wheel 71, driven by a cord or band 72, guided by pulleys 73 and 74 from the wheel 75 on the shaft 30.

The lever 70 is vibrated by an armature 76, attached to it and located between two electromagnets 77 and 78. Magnets 77 and 78 are capable of being energized alternately by the following means: An electric current is generated by a battery 79, from one electrode of which a conductor 79' extends and is forked with one branch connected to the helix of each electromagnet 77 and 78, from each of which helices, by separate insulated conductors 79'' and 79''', the electrodes 80 and 81 placed above and below the longer end of the beam 52. The other electrode of the battery 79 is connected by an insulated conductor 79'''' to the beam 52 and a terminal or electrode 82, which, as the beam 52 rises or falls, closes the circuits alternately through the conductors 79'' and 79''' and the helices of the electromagnets 77 and 78, so that when the end of the beam 52 rises the electrode 82 connects with the electrode 80, and the magnet 77 is excited and attracts the armature 76 and engages the wheel 68 with the internal frictional rim 66 of the wheel, turns the wheel 66, and the described intermediate transmitting parts connecting it with the screw 52, moves the poise 56 farther from the knife edges 53, and continues such motion until equilibrium is established. When the end of the beam 52 descends below the plane of equilibrium then the electrode 81 connects with the electrode 82, and the magnet 78 is excited and attracts the armature 76 and engages the wheel 68 with the frictional rim 67. This causes the wheel 65 and mechanism connected with it, with the screw 52, to rotate in opposite direction, and the poise-weight is moved nearer to the fulcrum knife edges 53 to balance the reduced stress.

From the construction of the machine the conductors 79'', 79''' and 79'''' are not visible throughout their length, and to aid in understanding their arrangement the key or double switch 83 and 84, the electrodes 80, 81 and 82, the magnets 77 and 78, armature 78, and battery 79 are separately depicted in Fig. 18. The electric conductors 79'' and 79''' have placed in them, between the helices of the magnets 77 and 78 and the electrodes 80 and 81, a double key or switch 83 and 84', whereby the circuit of each can be opened or closed and the automatic operation of the weighing of stresses suspended or resumed at the will of the operator. This means of controlling the weighing by hand enables the operator to manipulate tests with a degree of delicacy and facility at times more satisfactory than by the automatic operation of these parts.

The mechanism for automatically making a graphic record of the properties of the specimen under test derives the motion for indicating and marking the stress at different points from a connection with the poise-operating wheel 58, as follows: A pinion 84 engages in the wheel 58 and turns an arbor 87' supported in bearings 85 and 86 on the beam 52, upon the end of which arbor 87' is a bevel-wheel 85', turning another bevel-wheel 86', secured on the upper end of a vertical arbor 87, turning and supported in a bearing 88. There is attached to the lower end of the arbor 87 a universal joint 89, having its axes of flexure in a plane coincident with the axis of motion of the knife edges 53 of the beam 52, so that the motion transmitted through the arbor 87 neither affects or is affected by the oscillation of the beam 52. The arbor 87 is extended below the universal joint 89, and is supported and guided near its lower end by the bearing 90, attached to the frame or bed 1, and carries a bevel-wheel 91, which engages in and turns another bevel-wheel 92 on a horizontal arbor 93, supported in bearings 94 and 95, attached to the bed 1. An endless screw on the arbor 93 turns a worm-wheel 129 on an arbor 130, turning in bearings 131 and 132, secured to the bed 1. On the arbor 130 are secured two spur-wheels 96 of equal diameter, which engage in parallel racks 97, attached to a carriage 98, supported on rollers 98', guided by rails 99, and bearing a transversely-movable pencil-holder 100, having a joint 101 to permit it to be raised from the recording-table 102, and a socket 103 to receive the pencil 104.

The recording-table 102 is a flat plate 105 adapted to hold a diagram-sheet 133, supported on wheels 136, guided on rails or tracks 107 formed in the bed 1, and is moved lengthwise or in a direction parallel with the elongation of the specimen and at right angles to the stress motion of the pencil-holder by a connection with the specimen made from one of two definite points intermediate between those to which the extension-clamps 44 and 45 are applied, as hereinafter explained.

The object of testing being to ascertain, among other things, the amount of extension which takes place in a definite length of a specimen of known cross-section and under a known force, it is necessary for purposes of accuracy that the parts of the specimen immediately contiguous to and included in the clamps (which parts are affected in form by the gripping compression) should be excluded from the measuring operation. In this machine this is accomplished by applying a two-edged spring-clamp 108 and 108', such as is shown in Fig. 10, to each point of limit of the length desired to be measured and recorded. The clamps 108 and 108' are formed with knife edges 134 inside, which converge toward the bowed and slightly-elastic end 135, so that by simply pressing them on the specimen they retain their position against a moderate degree of force applied in a direction lengthwise of the specimen, or they may be made parallel and contractible, as shown in Fig. 10ᵃ.

The clamp 108 near to the gripping-clamp 45 fits between two parallel surfaces 112 in a frame 109, connected with the recording-table 102, so as to move it in the direction of its length to the same extent that that point of the specimen moves. The pencil-holder 100 is provided with wheels 110, which roll upon and are guided by rails 111, at right angles to the rails 99 on the carriage 98. The effect of this motion of the recording-table, which equals in extent and is coincident in time with the motion or extension of the part of the specimen between the clamps 108 and 45, is to exclude indications of the extension of such part from the diagram-record. The other clamp, 108', is similarly applied between like parallel surfaces 113 (shown in Figs. 5, 7, and 9) in standards secured to the bar 114, movably supported in the bed 1. The bar 114 is connected to the pencil-holder 100 by the frame 115, so as to move it in the direction of the length of the specimen.

The bar 114, being preferably made of light wood, is supported on rollers so as to move freely in the direction of the length of the specimen. The effect of connecting the diagram or recording carriage with the clamp 108' as applied to the specimen is to exclude from the indications in the diagram-record all effects due to change in other parts of the specimen under test between the clamps 44 and 108'. The transverse motion of the pencil 104 is governed by the stress as weighed by the beam 52 and poise 56, and ordinates to the curve delineated by the pencil 104, erected upon an axis parallel with the axis of the specimen, and tension-screw are proportionate to the stresses. While abscissæ to the curve parallel with such axis are proportionate with the degree of extension under each stress as measured and autographically inscribed on the diagram.

In order to observe the minute degree of extension for the purpose of investigating the properties and functions of elasticity and limits of elasticity and ductility of specimens under test, a dial 118 and index 119 are provided. These are attached to the recording-table 102, so as to participate in its motion in the direction of the axis of the specimen. An arbor 120, with the index 119 sweeping over the dial 118, is turned by a pinion 121 placed on the arbor 120, moved by a toothed segment 122 of long radius, engaging in the pinion 121 and turning on a pivot 123. The segment 122 receives motion from a toothed segment 124 of short radius, engaging in the teeth of a rack 125, formed in a spring 126, attached to the frame 115, connecting the bar 114 with the movable pencil-holder 100. The teeth of the segment 124 and of the rack are made with considerable taper, so as to disengage or slip out of engagement in the event of the motion due to the extension of the specimen exceeding the limit imposed by the length of the segment 122, and in order to disengage the rack 124, when not required for use, a thumb-screw 128, fitted to screw through the frame 127, is provided to press upon the spring 126 and hold the rack 125 in disengaged position from the toothed segment 124.

Having described my invention, what I claim is—

1. In a horizontal tensile testing-machine, a traveling extension-head, a gripping-clamp attached thereto; means of drawing said head with different velocities, and degrees of force, in combination with a second clamp, a weighing-beam having a vertical arm connected to said clamp, a graduated weighing-beam connected therewith, and an automatic mechanism for progressively moving the poise on said beam into equilibrium with the stress applied, substantially as set forth and described.

2. In a machine for testing and indicating properties of material under tension; a gripping mechanism for holding specimens therein, a second gripping mechanism and a connected stress-weighing mechanism in combination with intermediate clamps arranged to connect a recording-pencil with one point on the specimen and a diagram-holding surface with another point in said specimen, substantially as set forth.

3. In a mechanism for testing and indicating properties of material under tensile strain, a recording-pencil moving transversely to a diagram-surface and longitudinally with an intermediate point in the length of the specimen, in combination with a recording-surface connected with and moved by such connection with another intermediate point in said specimen, substantially as set forth.

4. In a testing apparatus for showing, and recording properties of material under tensile stress spring-clamps adapted to embrace and hold specimens of varying diameter at points intermediate in the length thereof in combination with holders each having parallel surfaces perpendicular to the line of stress and fitted upon said spring-clamps so as to permit free lateral motion between each holder and the clamp embraced by it one of said holders being connected with the recording-surface and the other with the recording-pencil substantially as set forth.

5. In a testing apparatus for indicating properties of material under tensile strain, a dial connected as to motion lengthwise, to an intermediate point in the specimen under tension; an index moving in contiguity to said dial, in combination with a rack an elastic connection between said rack and another point intermediate in the length of said specimen a toothed segment engaging said rack and connected with and operating said index, said segment and rack being held in engagement with each other by the elasticity of the connection between the rack and specimen substantially as set forth.

6. In a machine for testing materials by tensile stress, a stress applying and relieving apparatus, consisting of a screw, having a suitable clamp attached thereto, a nut arranged to move such screw lengthwise, worm-wheels turning upon said screw, with different velocities, and capacities for power transmission, a pulley turning upon said nut, in combination with clutches arranged to alternately engage either worm-wheel or said pulley with said nut, as and for the purposes set forth.

7. In a machine for testing material under tensile stress, a recording-pencil holder, having connected therewith and with a spring-clamp adapted to grasp a specimen, a traveling frame having a like connection, adapted to grasp another point in the length of a specimen, and with a recording-surface, arranged to move under said pencil in combination with a wooden rod attached thereto, and clamps adapted to hold said rod in connection with the specimen, substantially as set forth.

8. In a machine for testing and exhibiting the properties of material under tensile stress, a reversible stress-applying mechanism a stress-weighing apparatus containing a beam and a progressively-moving poise, an automatic mechanism for moving said poise, electromagnets and an armature controlling such automatic motion, electrodes operated by the oscillations of said beam, and an electric circuit and generator, in combination with an electric switch in said circuit, a dial and an index arranged to exhibit minute degrees of extension and levers and the described connected mechanism arranged to control and reverse the motion of the stress-applying mechanism substantially as set forth.

9. In a testing-machine for indicating and recording properties of material under tensile stress a dial having attachments adapted to connect it as to motion lengthwise with an intermediate point in the length of the specimen in combination with an index moving in contiguity with said dial, and an operating mechanism adapted to connect said index with another point intermediate in the length of the specimen, said operating mechanism embracing a rack, a toothed segment engaged in said rack a spring connecting said rack with the attachment to the specimen, and normally enforcing engagement between the teeth of the rack and segment, and a screw or equivalent means for disengaging said rack from said segment substantially as set forth.

TINIUS OLSEN.

Witnesses:
C. R. MORGAN,
LACEY B. CADWALLADER.